United States Patent [19]
Woodle

[11] 3,992,944
[45] Nov. 23, 1976

[54] ADSORPTION TYPE GAS-FILLED THERMOMETER
[75] Inventor: Robert A. Woodle, Nederland, Tex.
[73] Assignee: Texaco Inc., New York, N.Y.
[22] Filed: Dec. 23, 1974
[21] Appl. No.: 535,756

[52] U.S. Cl. .............................................. 73/368.2
[51] Int. Cl.² ........................................ G01K 5/38
[58] Field of Search .................................. 73/368.2

[56] References Cited
UNITED STATES PATENTS

| | | | |
|---|---|---|---|
| 2,868,017 | 1/1959 | Beard | 73/368.2 |
| 3,410,141 | 11/1968 | Zurstadt | 73/368.2 |
| 3,766,783 | 10/1973 | Tortoso | 73/368.2 |

FOREIGN PATENTS OR APPLICATIONS
1,044,576  10/1966  United Kingdom ................ 73/368.2

Primary Examiner—Richard C. Queisser
Assistant Examiner—Frederick Shoon
Attorney, Agent, or Firm—T. H. Whaley; C. G. Ries; Henry C. Dearborn

[57] ABSTRACT

A gas-filled thermometer which employs hydrogen and an adsorbent compound in a temperature sensitive bulb, with a pressure transducer connected to the bulb to indicate the temperature. The adsorbent compound has a composition conforming to the formula $LT_5$ where L is a lanthanide rare earth element and T is a 3d-transition element.

11 Claims, 1 Drawing Figure

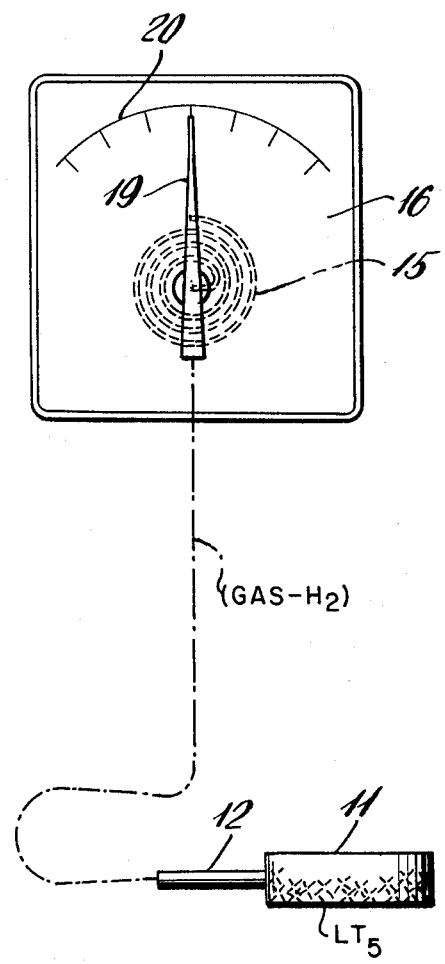

ADSORPTION TYPE GAS-FILLED THERMOMETER

BACKGROUND OF THE INVENTION

1. Field of the Invention

This invention concerns gas type thermometers in general, and more specifically deals with an improved adsorption type of gas filled thermometer.

2. Description of the Prior Art

It has been suggested in the past that a gas type temperature measuring system may be improved by employing an adsorbing material in the gas bulb which is subjected to temperature variations. This reduces the volume of gas that is required to provide the desired temperature indications. However, even the best of such prior suggestions failed to produce a thermometer that was satisfactory for the size of temperature bulb and as to other parameters involved.

Thus, for example, a U.S. Pat. No. 3,766,783 to Tortoso issued Oct. 23, 1973 which describes a thermometer of the indicated general type according to the prior art. However, its pressure-temperature characteristics are quite inferior when compared to a thermometer according to this invention.

Therefore, it is an object of this invention to provide an improved adsorption type gas thermometer having greatly superior characteristics.

SUMMARY OF THE INVENTION

Briefly, the invention concerns an adsorption type gas-filled thermometer. It comprises a temperature sensitive bulb having a gas adsorbent therein connected to a pressure transducer for indicating the amplitude of gas pressure in a closed system connecting said bulb to said transducer. In the foregoing combination, the gas is hydrogen and the said adsorbent is a compound of the formula $LT_5$ where L is a lanthanide rare earth element and T is a 3d-transition element.

Again briefly, the invention concerns an adsorption type gas-filled thermometer which comprises a metal bulb having a pre-determined quantity of $LaNi_5$ therein. It also comprises a Bourdon spiral for transforming gas pressure into a proportional physical displacement, and a predetermined length of capillary tubing for connecting said metal bulb to said Bourdon spiral. It also comprises a predetermined quantity of hydrogen gas filling said bulb spiral and tubing. The quantity of hydrogen is between 0.2 mole $H_2$ per mole $LaNi_5$, and 3 moles $H_2$ per mole $LaNi_5$.

Once more briefly, the invention concerns an improvement in an adsorption type gas-filled thermometer that includes a temperature sensitive bulb having a predetermined quantity of adsorbent material therein, and also includes a pressure transducer in a sealed system connecting said bulb to said transducer. In the foregoing combination the improvement comprises employing as said adsorbent material, a compound of the formula $LT_5$ wherein L is a lanthanide rare earth element and T is 3d-transition element. The improvement also comprises employing hydrogen as said gas.

BRIEF DESCRIPTION OF THE DRAWING

The foregoing and other objects and benefits of the invention will be more fully set forth below in connection with the best mode contemplated by the inventor of carrying out the invention, and in connection with which there are illustrations provided in the drawing, wherein:

The FIGURE of drawing illustrates schematically a gas-filled type thermometer with temperature sensitive bulb and Bourdon spiral for indicating temperatures.

DESCRIPTION OF THE PREFERRED EMBODIMENT

As indicated above, it has heretofore been suggested that a gas-filled thermometer system may be provided which makes use of an arrangement whereby a temperature sensitive element contains a solid adsorbent material. The changes in temperature at the sensitive element will affect the adsorbtion properties so that gas is adsorbed or desorbed and causes corresponding changes in pressure on the gas in the system. However, known systems of the indicated type have had various limitations including that relating to the amount of gas and adsorbent material required by the system. Consequently, the maximum length of capillary tubing that was feasible with a sensitive element of reasonable size, was quite limited.

It has been discovered that by employing hydrogen gas with an adsorbent compound that has an ability to selectively adsorb large amounts of pure hydrogen, a superior thermometer may be constructed. Thus, by using as the adsorbent a compound of the formula $LT_5$ where L is a lanthanide rare earth element and T is a 3d-transition element, there is provided (with the use of hydrogen) a system that takes advantage of this group of compounds ability to adsorb large amounts of hydrogen. A principal advantage of thus using the combination with hydrogen of a $LT_5$ compound, comes from the very large value of the ratio of volume of hydrogen to the volume of adsorbent. This ratio is a large order increase over prior gas-adsorbent combinations in the field of temperature measurements. For example, a system using a lanthanum-nickel compound with hydrogen gas, has a ratio in the range of about 500 to 1500. Whereas, a prior type of combination employing activated carbon with propane, has a gas volume per volume of sorbent which is only on the order of 100 or less.

I have found that the rare earth elements which are suitable for use in a temperature measuring system according to this invention, include those elements having atomic numbers from 57, i.e. lanthanum, to 71 i.e. lutetium inclusive. The transition metals that are suitable include cobalt and nickel. I have also found that compounds formed of more than one lanthanide element with more than one transition element are also within the scope of suitable adsorbents to provide the benefits according to this invention. For example, compounds employing lanthanum and cerium with nickel would be suitable. Similarly, lanthanum with nickel and cobalt is suitable as well as lanthanum and cerium with nickel and cobalt. The chemical formulas for the foregoing compounds read as follows: $(La, Ce) Ni_5$; $La (Ni, Co)_5$; and $(La, Ce) (Ni, Co)_5$. In other words, compounds employing lanthanum or cerium with nickel, would include the compounds $La Ni_5$ and $Ce Ni_5$ taken together in any proportions.

In like manner, lanthanum with nickel and cobalt would include the compounds $La Ni_x Co_{5-x}$ (where $x = 0-5$) and/or the compounds $La Ni_5$ and $La Co_5$ taken in any desired proportions. And, finally in a similar manner, the compounds employing lanthanum and cerium with nickel and cobalt, would include the chemical compounds $LaNi_xCo_{5-x}$ (where $x = 0-5$), or $CeNi_xCo_{5-x}$ (where $x = 0-5$), taken in any proportions, as well as the compounds $LaNi_5$; $LaCo_5$; $CeNi_5$; or $CeCo_5$, taken in any proportions.

It will be appreciated that the selection of a specific adsorbent would be made on the basis of the temperature range which it is desired to measure. The $LT_5$ compounds which have high equilibrium hydrogen pressures at room temperature are suitable for low temperature applications, while those compounds showing low equilibrium hydrogen pressures at room temperatures are suitable for high temperature applications. Thus, reference may be had to the following table which lists a number of $LT_5$ compounds and their approximate equilibrium hydrogen pressures at room temperature in pounds per square inch absolute, as well as their approximate temperature measurement ranges in degrees Fahrenheit.

SORBENTS, EQUILIBRIUM PRESSURES, AND TEMP. RANGES

| Sorbent Compound | Equilibrium $H_2$ Pressure At Room Temp., PSIA | Temperature Measurement Range, °F |
|---|---|---|
| $LaCo_5$ | 0.6 | 300 – 1000 |
| $PrCo_5$ | 7.4 | 200 – 600 |
| $NdCo_5$ | 12 | 200 – 500 |
| $CeCo_5$ | 22 | 100 – 400 |
| $LaNi_5$ | 37 | 100 – 400 |
| $SmCo_5$ | 60 | 50 – 300 |
| $PrNi_5$ | 177 | 0 – 250 |
| $GdCo_5$ | 300 | −50 – 150 |
| $NdNi_5$ | 300 | −50 – 150 |
| $CeNi_5$ | 900 | −200 – 50 |
| $SmNi_5$ | 900 | −200 – 50 |

It also may be noted that although the different $LT_5$ compounds adsorb different amounts of hydrogen, the quantity of hydrogen used in a temperature measuring system should correspond to the plateau of the specific $LT_5$ adsorption isotherm. The amount of hydrogen will normally be at least 0.2 mole $H_2$ per mole $LT_5$, and less than about 3 moles $H_2$ per mole $LT_5$.

With reference to the drawing, a particular example of a temperature measuring instrument is schematically illustrated. Thus, there is a metal bulb 11 which is the temperature sensing element. The bulb 11 is connected by capillary tubing 12 to a Bourdon spiral 15 which is supported on a temperature indicating instrument panel 16. The spiral 15 is mounted in a conventional manner so as to actuate a pointer 19 which rotates over a calibrated dial 20 to provide the temperature indications.

It will be appreciated that the Bourdon spiral 15 might take other and different forms. However, so long as it carries out the desired function of acting as a transducer for changing gas pressure indication into a physical displacement, it will accomplish the desired result of indicating temperature in accordance with the pressure of the hydrogen in the system.

A thermometer which was constructed in accordance with the foregoing schematic illustration, had dimensions as follows. The sensing element was a metal bulb which was one centimeter in diameter by six centimeters in length and it had a volume of about five cubic centimeters. There was introduced into the bulb 43.2 grams of a lanthanum-nickel compound, i.e. $LaNi_5$. The metal bulb was joined to a 200 foot length of capillary tubing which was fitted with a Bourdon spiral. The bulb-tubing-spiral arrangement was evacuated and held at a temperature of 70° F, while 4480 cubic centimeters of gaseous hydrogen (measured at standard conditions) was introduced. The tubing was then sealed, and the thermometer was found suitable for temperature measurements over the range from 50° to 250° Fahrenheit.

While a preferred embodiment of the invention has been described above in considerable detail, in accordance with the applicable statutes, this is not to be taken as in any way limiting the invention but merely as being descriptive thereof.

I claim:

1. An adsorption type gas-filled thermometer, comprising
a temperature sensitive bulb having a gas adsorbent therein connected to a pressure transducer for indicating the amplitude of gas pressure in a closed system connecting said bulb to said transducer, wherein
said gas is hydrogen, and
said adsorbent comprises at least one compound consisting of the formula $LT_5$, where L is a lanthanide rare earth element and T is a 3d-transition element.

2. An adsorption type gas-filled thermometer according to claim 1, wherein
said lanthanide rare earth element has an atomic number from 57 to 71, and
said 3d-transition element is selected from the elements cobalt and nickel.

3. An adsorption type gas-filled thermometer according to claim 2, wherein
said adsorbent consists of a plurality of said lanthanide element compounds.

4. An adsorption type gas-filled thermometer according to claim 1, wherein
said lanthanide element has an atomic number from 57 to 71, and
said adsorbent consists of a plurality of said 3d-transition element compounds.

5. An adsorption type gas-filled thermometer according to claim 4, wherein
said adsorbent consists of a plurality of said lanthanide element compounds and said 3d-transition element compounds.

6. An adsorption type gas-filled thermometer, comprising
a metal bulb having a predetermined quantity of $LaNi_5$ therein,
a Bourdon spiral for transforming gas pressure into a proportional physical displacement,
a predetermined length of capillary tubing for connecting said metal bulb to said Bourdon spiral, and
a predetermined quantity of hydrogen gas filling said bulb spiral and tubing being between 0.2 mole $H_2$ per mole $LaNi_5$ and 3 moles $H_2$ per mole $LaNi_5$.

7. A method of measuring temperature which employs an adsorption type gas-filled thermometer including a temperature sensitive bulb having a predetermined quantity of absorbent material therein and including a sealed system connecting said bulb to said transducer, the improvement comprising
employing at least one compound as said adsorbent material which consists of the formula $LT_5$ wherein L is a lanthanide rare earth element and T is a 3d-transition element, and
employing hydrogen as said gas.

8. A method of measuring temperature according to claim 7, wherein said rare earth element has an atomic number from 57 to 71 inclusive.

9. A method of measuring temperature according to claim 8, wherein
said improvement comprises employing a plurality of said rare earth element compounds.

10. A method of measuring temperature according to claim 8, wherein
said improvement comprises employing a plurality of said 3d-transition element compounds.

11. A method of measuring temperature according to claim 8, wherein
said improvement comprises employing a plurality of said rare earth element compounds and a plurality of said 3d-transition element compounds.

* * * * *